US011583075B2

(12) United States Patent
Bianco et al.

(10) Patent No.: US 11,583,075 B2
(45) Date of Patent: Feb. 21, 2023

(54) SELECTIVE ACCESS DEVICE FOR A PICKING/DEPOSITING STATION IN A WAREHOUSE, AND PICKING/DEPOSITING STATION PROVIDED WITH SUCH SELECTIVE ACCESS DEVICE

(71) Applicant: ICAM S.R.L., Putignano (IT)

(72) Inventors: Roberto Bianco, Putignano (IT); Giovanni Mezzapesa, Putignano (IT); Roberto Impedovo, Castellana Grotte (IT); Benedetto Marzolla, Conversano (IT)

(73) Assignee: ICAM S.R.L., Putignano (IT)

( * ) Notice: Subject to any disclaimer, the term of this patent is extended or adjusted under 35 U.S.C. 154(b) by 364 days.

(21) Appl. No.: 16/635,860

(22) PCT Filed: Aug. 3, 2018

(86) PCT No.: PCT/IB2018/055852
§ 371 (c)(1),
(2) Date: Jan. 31, 2020

(87) PCT Pub. No.: WO2019/026042
PCT Pub. Date: Feb. 7, 2019

(65) Prior Publication Data
US 2020/0369471 A1    Nov. 26, 2020

(30) Foreign Application Priority Data

Aug. 3, 2017   (IT) ..................... 102017000089864

(51) Int. Cl.
*A47B 53/02*        (2006.01)
*B65G 1/04*         (2006.01)
(Continued)

(52) U.S. Cl.
CPC ................ *A47B 53/02* (2013.01); *B65G 1/02* (2013.01); *B65G 1/0485* (2013.01); *B65G 1/127* (2013.01);
(Continued)

(58) Field of Classification Search
CPC ......... A47B 53/02; A47B 46/00; A47B 96/00; B65G 1/02; B65G 1/0485; B65G 1/127; B65G 1/137; E06B 5/006; E06B 9/115
(Continued)

(56) References Cited

U.S. PATENT DOCUMENTS 161,829 A * 4/1875 Sherer
2,248,813 A * 7/1941 Arcey ................... F25D 23/025
D15/89
(Continued)

FOREIGN PATENT DOCUMENTS

DE      102016121106    *   5/2018
EP         0508903      *  10/1992
(Continued)

*Primary Examiner* — Janet M Wilkens
(74) *Attorney, Agent, or Firm* — Leason Ellis LLP

(57) ABSTRACT

A selective access device for a picking/depositing station in warehouse defines an access area engaged by a first cover that is defined by a pair of movable plane surfaces parallel or coplanar to one another; these plane surfaces are slidable along a first rectilinear axis under the action of a movement system so as to open/close a first opening; in the access area, there is provided a second cover above the first cover, to define a second opening aligned with the first opening; the second cover consists of a plurality of doors, each rotating about a relative rotation axis in respect to the first cover; the doors are arranged side-by-side along a second rectilinear axis, orthogonal to the first axis and are closed by respective locks, while the rotation axes are parallel to this second axis.

11 Claims, 4 Drawing Sheets

(51) Int. Cl.
   *B65G 1/127*   (2006.01)
   *B65G 1/137*   (2006.01)
   *B65G 1/02*    (2006.01)
   *E06B 5/00*    (2006.01)
   *E06B 9/11*    (2006.01)
(52) U.S. Cl.
   CPC .............. *B65G 1/137* (2013.01); *E06B 5/006* (2013.01); *E06B 9/115* (2013.01)
(58) Field of Classification Search
   USPC ........... 312/109, 297, 295, 304, 310, 35, 97, 312/97.1, 249.7, 291, 300, 138.1, 212, 312/211, 327, 328
   See application file for complete search history.

(56) References Cited

U.S. PATENT DOCUMENTS

| | | | | |
|---|---|---|---|---|
| 5,820,237 | A * | 10/1998 | Robey | A47B 49/002 312/139.2 |
| 5,836,662 | A * | 11/1998 | Robey | A47B 49/002 312/97 |
| 6,024,425 | A * | 2/2000 | Imai | B65G 1/04 254/338 |
| 6,450,598 | B1 * | 9/2002 | Hanel | B65G 1/127 312/297 |
| 6,561,250 | B2 * | 5/2003 | Hutchins | G09F 11/025 160/122 |
| 7,723,943 | B2 * | 5/2010 | Fu | A47B 96/00 49/455 |
| 8,714,669 | B1 * | 5/2014 | Clausen | A47B 49/004 312/297 |
| 9,504,344 | B2 * | 11/2016 | Sarvestani | A47G 29/1201 |
| 10,624,484 | B1 * | 4/2020 | Mountford | B60P 3/03 |
| 10,888,189 | B2 * | 1/2021 | Pointeau | G06Q 10/08 |
| 2002/0130135 | A1 | 9/2002 | Fitzgerald et al. | |
| 2002/0177922 | A1 | 11/2002 | Bloom | |
| 2004/0004419 | A1 * | 1/2004 | Godlewski | A47B 63/06 312/297 |
| 2004/0031574 | A1 | 2/2004 | Gambarelli et al. | |
| 2014/0367221 | A1 * | 12/2014 | Holmes | G07F 17/0092 198/347.2 |
| 2019/0111955 | A1 * | 4/2019 | Canoso | E05F 15/73 |

FOREIGN PATENT DOCUMENTS

| | | | |
|---|---|---|---|
| EP | 1 061 013 | | 12/2000 |
| EP | 1382273 | * | 1/2004 |
| EP | 1404595 | | 4/2004 |
| EP | 2203365 | | 7/2010 |
| GB | 885999 | * | 1/1962 |
| IT | TO2014A000385 | | 5/2014 |
| KR | 101177180 | * | 8/2012 |
| KR | 20180107748 | * | 10/2018 |
| WO | 2011050870 | * | 5/2011 |
| WO | 2015036879 | * | 3/2015 |

* cited by examiner

SELECTIVE ACCESS DEVICE FOR A PICKING/DEPOSITING STATION IN A WAREHOUSE, AND PICKING/DEPOSITING STATION PROVIDED WITH SUCH SELECTIVE ACCESS DEVICE

CROSS-REFERENCE TO RELATED PATENT APPLICATIONS

This application is a U.S. National Phase Application under 35 U.S.C. § 371 of International Patent Application No. PCT/IB2018/055852, filed on Aug. 3, 2018, which claims priority from Italian Patent Application No. 102017000089864 filed on Aug. 3, 2017, all of which are incorporated by reference as if expressly set forth in their respective entireties herein.

TECHNICAL FIELD

The present invention relates to a selective access device for a picking/depositing station in an automated warehouse.

BACKGROUND ART

Normally, automated warehouses are provided with storage areas having a plurality of locations that house respective containers or trays, normally rectangular shaped, in plan view, and generally provided with compartments for containing stored objects. These warehouses also have a picking/depositing bay or station, which users can access to deposit and/or pick up the objects. By means of motor driven automated mechanisms, the trays are transferred from their locations in a housing of the picking/depositing bay and are positioned so that one side element thereof, corresponding to one of the long sides of their rectangular shape, is arranged in front of the user.

In some warehouses, the picking/depositing bay is also provided with a selective access device, which is arranged above the aforesaid housing so as to prevent access thereto, for safety reasons, and is configured so as to open only at below compartments that must be accessed by the user.

In some known solutions, for example such as in EP1404595B1 and in EP2203365B1, the selective access device is of the type provided with doors. In other solutions, such as in the patent application ITT02014A000385 by the same applicant, the selective access device is of the type provided with roller shutters or shutters to increase the flexibility in opening areas of larger or smaller width above the tray.

In this solution, a first and a second pair of shutters are provided: the shutters of the first pair are guided so as to slide at a first level along a horizontal direction parallel to the long sides of the tray below, while the shutters of the second pair are guided so as to slide at a second level, lower than the first, along a horizontal direction parallel to the short sides of the tray.

Operation of the four shutters allows an opening to be defined, with dimensions adjustable at will, to selectively access one or more compartments of the tray below. Although the prior art solutions described above are very flexible, other aspects are not very satisfactory, in particular as regards safety against tampering.

In fact, as they are formed by a series of slats and/or by flexible material, the shutters are relatively flimsy and therefore per se subject to greater risk of forcing.

Moreover, the opening and closing times of the two shutters that slide parallel to the long side of the tray can be relatively high, in view of the extension in length of the tray on which they slide.

Moreover, in ITT02014A000385, the two shutters that slide parallel to the long side of the tray are deviated upwards along the side elements of the picking/depositing bay. If picking/depositing operations on two trays in the warehouse are required to be carried out simultaneously, for example to satisfy high material flows, two picking/depositing bays are installed; these must be separate and spaced at a distance from one another, to allow deviation and sliding of the shutters in the side elements of the bays, resulting in complexity and excessive overall dimensions of this solution.

Moreover, in general, the solutions with shutters have a relatively large number of components, for guiding and operating them and require additional electronic or physical barriers to guarantee a high level of safety for users. In particular, these additional barriers are provided to prevent manual access during movement of the shutters. Generally, a large number of components translates into high costs and more probability of encountering faults or malfunctions.

Furthermore, the presence of additional barriers tends to slow the picking/depositing operations due to an increase in the waiting times of users.

Finally, presence sensors (so-called photoelectric barriers) must be used to prevent any objects from extending above the compartments of the tray during closing of the shutters.

The document US2002130135 corresponds to the preamble of claim 1 and describes a casing having a plurality of compartments, which are arranged along rows and columns and each accommodate a relative product, which can be picked up through a closing device.

The latter has a plurality of horizontal rectangular openings aligned respectively with the rows of compartments and closed by respective rotatable doors. The closing device is also provided with a shutter, which has a vertical slot and is movable horizontally so as to align this slot with any one of the columns of the compartments.

DISCLOSURE OF INVENTION

The object of the present invention is to produce a selective access device for a picking/depositing station in a warehouse, which allows the problems set forth above to be solved in a simple and inexpensive manner and, preferably, allows users to ergonomically access the tray below.

According to the present invention, a selective access device for a picking/depositing station in a warehouse is produced, as defined in claim 1.

Moreover, according to the present invention, there is produced a picking/depositing station in a warehouse, as defined in claim 9.

BRIEF DESCRIPTION OF THE DRAWINGS

The invention will now be described with reference to the accompanying drawings, which illustrate a non-limiting example of embodiment thereof, wherein.

BEST MODE FOR CARRYING OUT THE INVENTION

Figure 1:
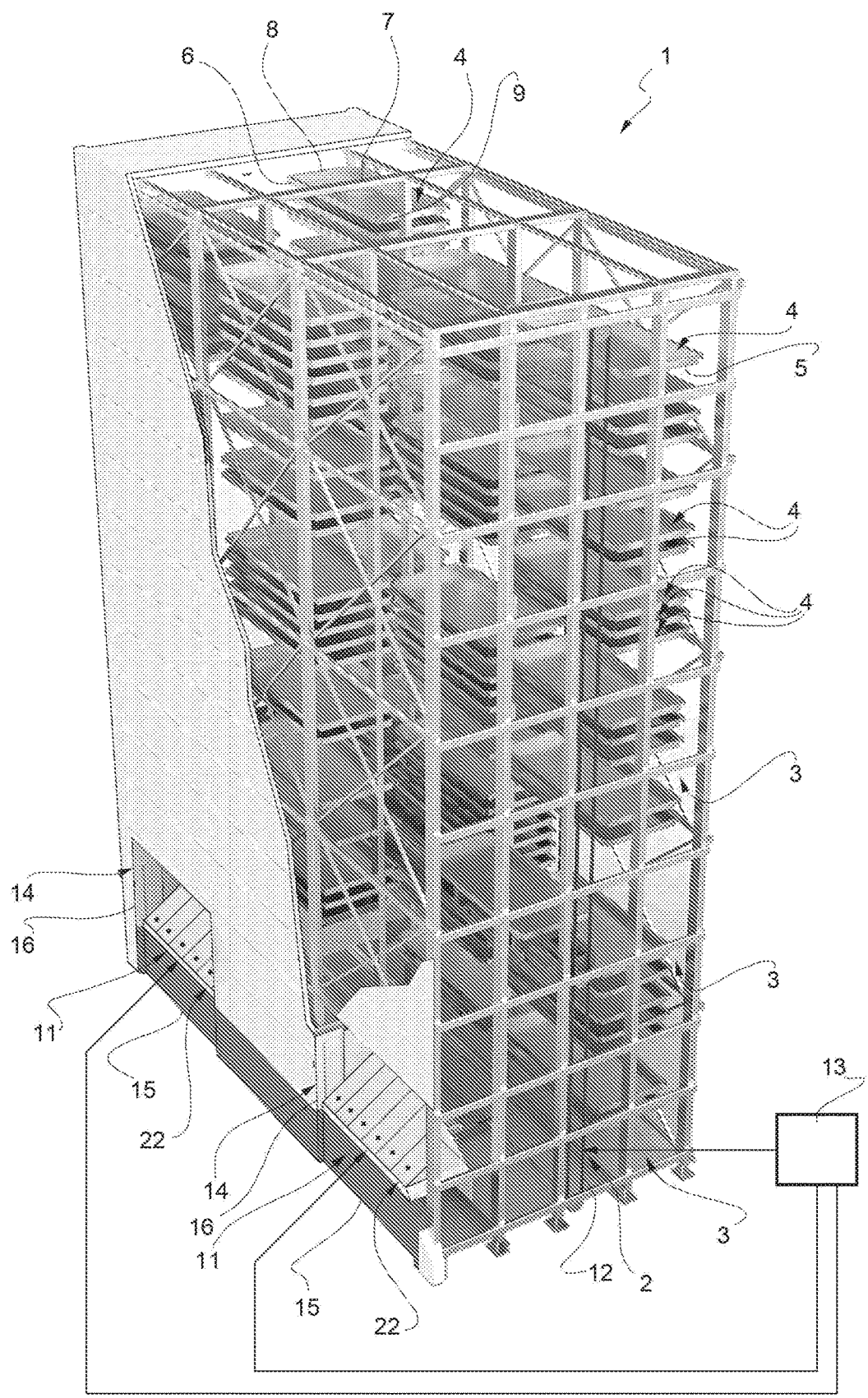
FIG. 1 is a perspective view, with parts removed for clarity, of an automated vertical warehouse with picking/depositing stations provided with a preferred embodiment of the selective access device according to the present invention.

In FIG. 1, the reference numeral 1 indicates an automated vertical warehouse comprising a fixed structure 2 and having a plurality of predefined locations 3 for storing respective loading units 4, defined in particular by containers or trays. Each loading unit 4 has a base 5 with a rectangular perimeter, defined by a pair of long sides 6 and 7 parallel to one another and by a pair of short sides 8 and 9 orthogonal to the long sides 6,7. According to a variant, not illustrated, the loading unit 4 has a substantially square base.

Figure 4:
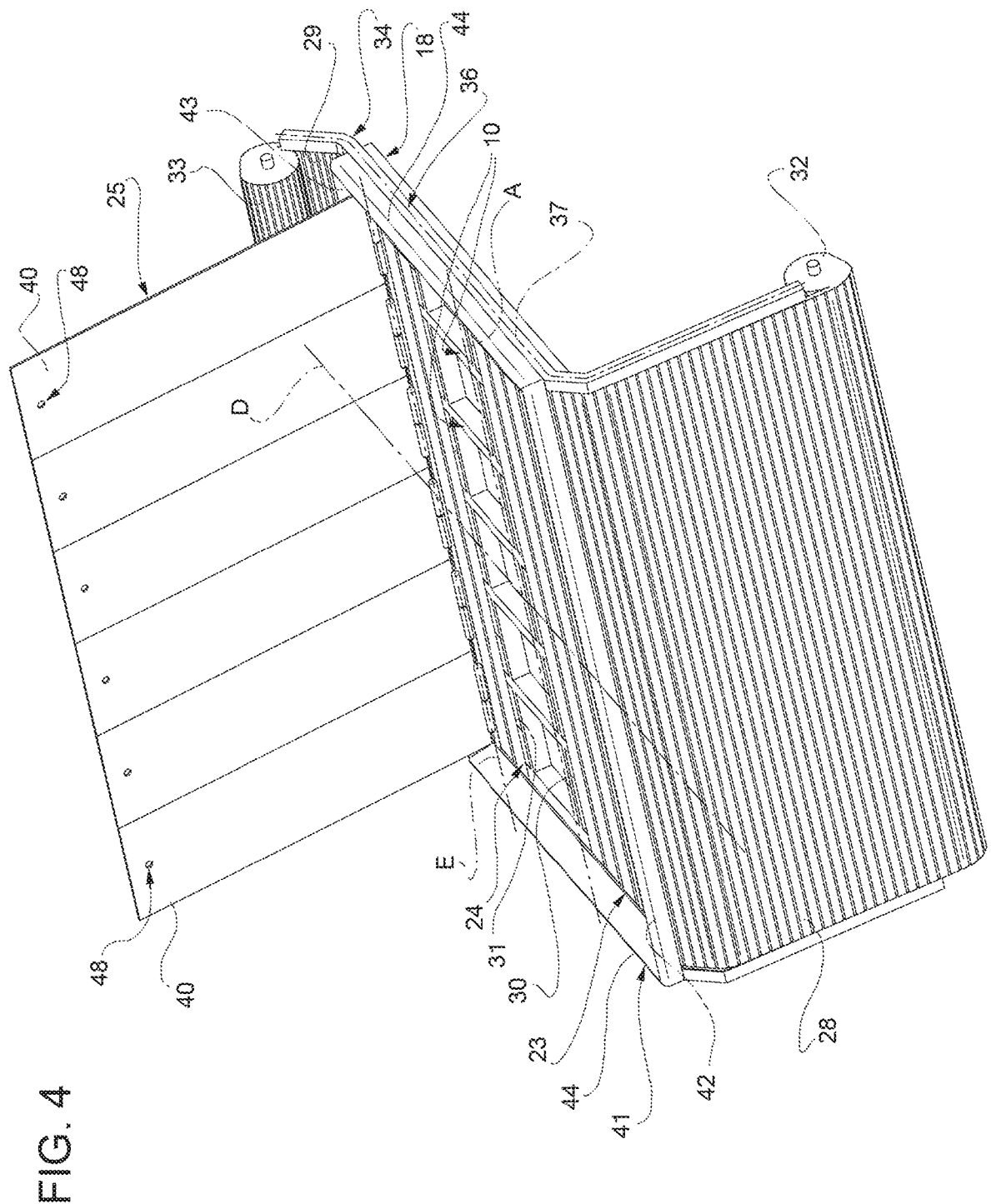
FIG. 4 illustrates, in a perspective view, the selective access device visible in FIGS. 2 and 3, in a different operating configuration.

Each loading unit 4 comprises a flank, which projects upwards from the perimeter of the base 5, and a plurality of inner walls that divide the total volume of the loading unit 4 into sectors or compartments 10 (FIG. 4), where different articles (not illustrated) can be housed.

As illustrated in FIG. 1, the warehouse 1 further comprises one or more picking/depositing stations 11, which define respective access points to the warehouse 1, as they allow one or more users (not illustrated) to pick up articles from the compartments 10 of the trays and deposit articles in these compartments 10.

Moreover, the warehouse 1 comprises: a motor driven transfer device, for example an elevator 12, configured so as to transfer the loading units 4 between their locations and the stations 11; and a processing and control unit 13 configured with appropriate software for the management and storage of the articles (for example, configured to control the elevator and therefore transfer of the loading units 4 based on controls and/or settings of the users; to select the loading unit 4 to be sent to the stations 11 based on optimisation strategies; to provide instructions or other information to the users at the stations 11; to monitor the state of stocks; etc. . . . ).

In the particular embodiment illustrated, the stations 11 are embedded in the structure 2 of the warehouse 1. According to an alternative, not illustrated, the stations 11 are defined by islands that protrude in respect to the structure 2.

Figure 2:
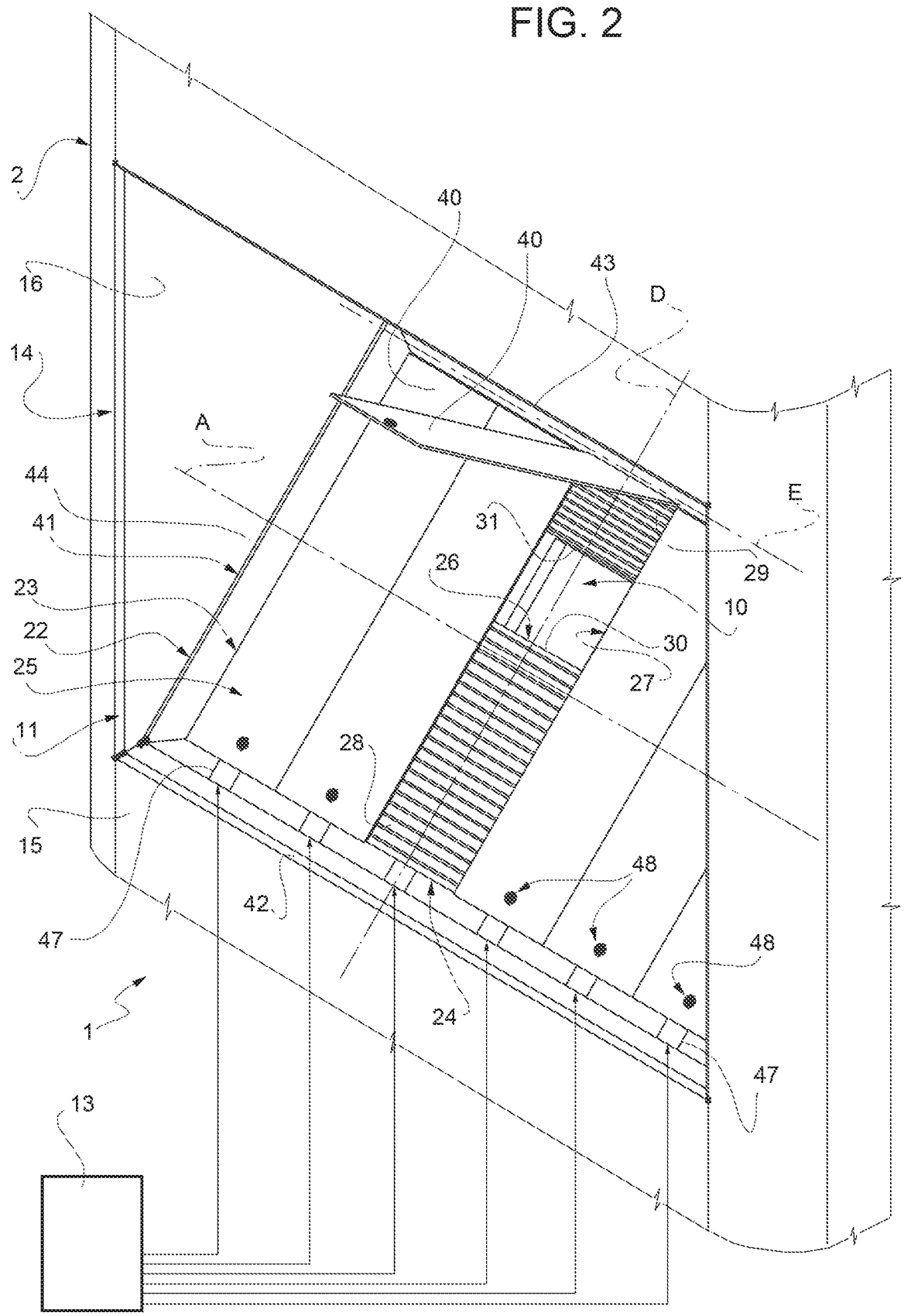
FIG. 2 shows in a perspective view in an enlarged scale, one of the picking/depositing stations of FIG. 1.

With reference to FIG. 2, the station 11 comprises a fixed frame 14, which in the particular example described forms part of the structure 2 and, preferably, comprises a front wall 15 and two vertical side elements 16, spaced from one another along a horizontal axis A. It must be specified that, here and hereunder, the terms "sides", "laterally", "front", "in front of", "rear", "behind", etc. . . . are meant with reference to the point of view of the user, positioned in front of the station 11 during picking/depositing of the articles.

Figure 3:
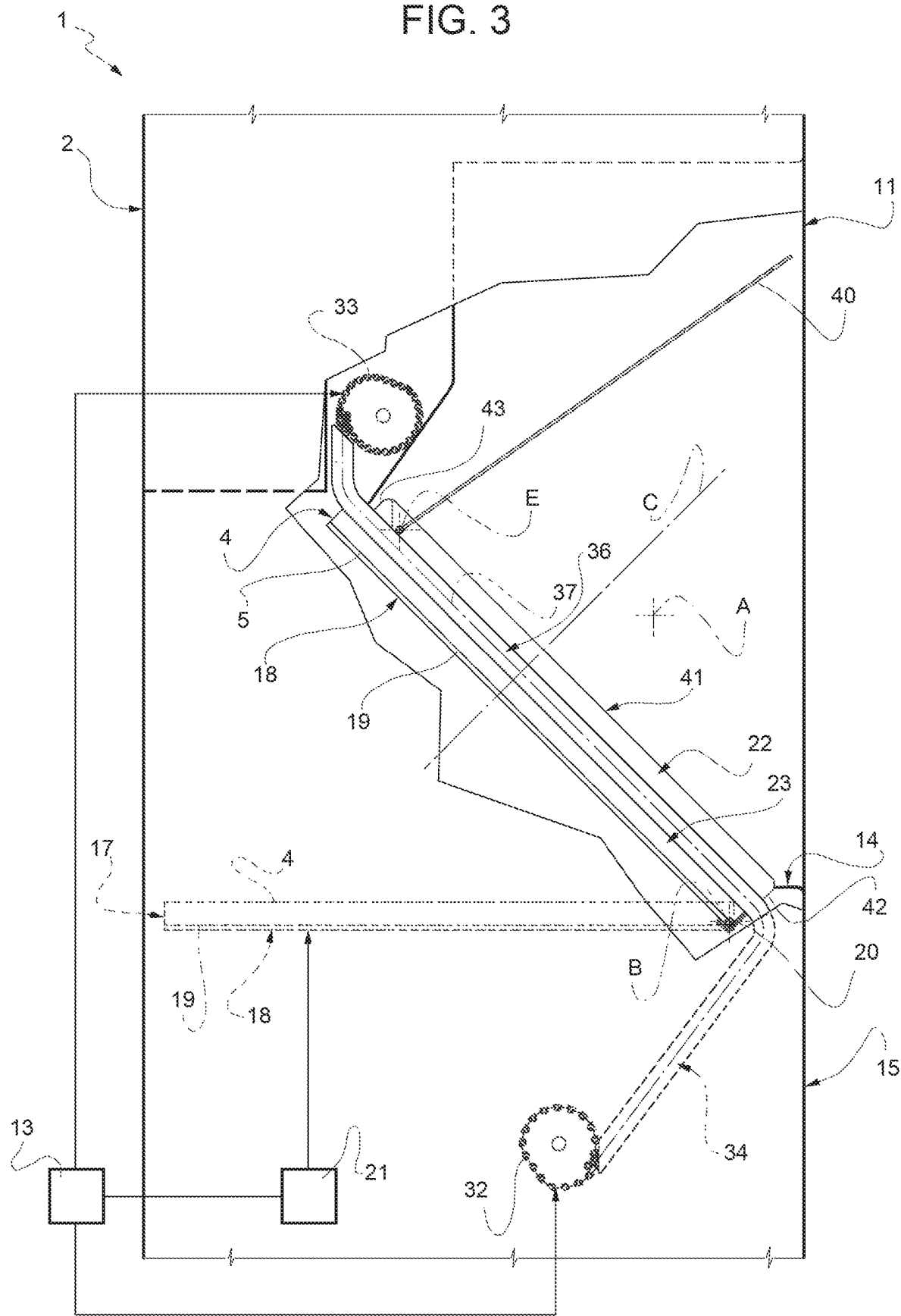
FIG. 3 shows, in a side view and with parts removed for clarity, the picking/depositing station of FIG. 2.

As shown in FIG. 3, the station 11 further comprises: a housing 17, having dimensions such as to house at least a loading unit 4 between the side elements 16, behind the wall 15; and a support device 18 coupled to the frame 14, to support the loading unit 4 in the housing 17. In particular, the device 18 comprises a pair of guides or channels 19, which are parallel to one another and orthogonal to the axis A, are carried respectively by the side elements 16 and are configured so as to receive the loading unit 4 when this latter is transferred from the elevator 12 inside the housing 17.

In the preferred embodiment illustrated, the support device 18 is movable so as to rotate about an oscillation axis B parallel to the axis A between a first operating condition, in which the base 5 of the loading unit 4 is horizontal for transfer from and towards the elevator 12, and a second operating condition, in which it keeps the base 5 in a position tilted by an angle different from 0° and 90°. Advantageously, the support device 18 comprises stop members 20 to prevent the loading unit 4 from sliding downwards due to its weight, into the second operating position. For example, the stop members 20 are defined by limit stop elements arranged at the front ends of the guides 19.

The unit 13, by controlling a movement device, for example an actuator 21 (schematically illustrated in FIG. 3), changes the tilt of the support device 18 automatically and by a predefined angle, immediately after the loading unit 4 enters the housing 17 and immediately before it is transferred out.

The station 11 further comprises a selective access device 22, which is coupled to the frame 14 in a fixed position, between the side elements 16. The device 22 defines an access area 23, which is substantially rectangular, is arranged above the housing 17 and is aligned with the latter along an axis C.

The axis C is orthogonal to the base 5 of the loading unit 4 which is supported by the device 18 in the second operating condition. Therefore, in the preferred solution illustrated, the axis C is fixed and is tilted with respect to the vertical towards the user.

According to an aspect of the present invention, the device 22 comprises two covers 24 and 25, which engage the area 23 and are arranged along respective planes, which are superimposed with one another and are orthogonal to the axis C, so as to prevent unauthorised access to the housing 17. In the side view of FIG. 3, the trace of these planes is identified by an axis D, which is orthogonal to the axes A and C and, given the tilt of the axis C, is tilted in respect to the horizontal by an acute angle. Preferably, the axis D has the same tilt as the base 5 of the loading unit 4 below, while the device 18 is in the second operating condition.

In particular, the perimeter of the area 23 has two long sides parallel to the axis A and two short sides parallel to the axis D.

According to a variant, not illustrated, the axis C is vertical, so that the axis D and the covers 24 and 25 are horizontal.

According to a further variant, not illustrated, the device 22 is tiltable through the action of an actuator controlled by the unit 13, between a horizontal position, in which the axis C is vertical and the covers 24 and 25 are horizontal, and a tilted position, such as the one shown in the accompanying figures. Advantageously, rotation of the device 22 is carried out together with rotation of the device 18, for example through a same movement device, such as the actuator 21. Even more advantageously, the devices 18 and 22 are united to each other so that they rotate together about the same oscillation axis B. Alternatively to the devices 18 and 22 being united, a transmission can be provided between these devices 18 and 22 to transmit the tilting motion caused by the single movement device.

With reference to FIG. 2, the covers 24 and 25 can be opened, in a manner coordinated with one another, so as to form, through the area 23, a passage that allows the user to access from above only the articles and/or compartments he/she is authorised to access. The opening 26 defined by the cover 24 has a width that is variable along the axis D, while the opening 27 defined by the cover 25 has a width that is variable along the axis A. Specifically, the degree of opening of the cover 25 is variable discretely, while the degree of opening of the cover 24 is variable continuously.

The device 22 comprises two roller shutters or shutters 28,29 operated by the control unit 13 and comprising respective end portions 30,31 which are coplanar or parallel to one another and are facing one another along the axis D so as to define the cover 24. Each roller shutter 28,29 is formed by rigid slats, parallel to the axis A and coupled to one another in an articulated manner. According to variants, not illustrated, the roller shutters are replaced by flexible sheets or walls, by cloths, by mesh structures, etc. . . . . Regardless of the particular solution chosen, the portions 30,31 define respective plane surfaces that are slidable along the axis D to define the opening 26 between their end edges. The device 22 further comprises two motor driven winders 32,33, one for each roller shutter 28 and 29, and two guides 34, which are arranged in fixed positions on the side elements 16, are engaged slidingly by the lateral edges of the roller shutters 28 and 29 and extend along a guide path 36, having a rectilinear intermediate portion 37 along the axis D.

According to variants, not illustrated, at least one of the winders 32,33 is adjacent to the path portion 37 so as to minimise the overall dimensions of the device 22.

As represented schematically in FIG. 3, the winders 32,33 are operated by the control unit 13 so as to wind and unwind the respective roller shutters 28,29 and, consequently, position the end portions 30,31 along the axis D independently of one another. As mentioned above, the distance between the edges of the end portions 30,31 defines the width of the opening 26. According to variants, not illustrated, the winders 32,33 are replaced by a different motor driven movement device, for example by traction and thrust devices of the rope or belt type.

Summarising the description above, by controlling these movement devices, it is possible to configure the cover 24 between a closed condition, in which the end portions 30,31 are side by side or partially overlapped, and an open condition, in which the end portions 30,31 define the opening 26, with variable dimension along the axis D.

With reference to FIG. 2, according to an aspect of the present invention, the cover 25 is formed by a plurality of doors 40 and is also configurable between a closed condition, in which the doors 40 are lowered and coplanar to one another so as to completely close the area 23 and cover the cover 24, and an open condition, in which at least one of the doors 40 is raised to define the opening 27.

The device 22 further comprises a substantially rectangular frame 41, which is arranged above the path portion 37 of the guides 34, is fixed to the frame 14 and/or to the guides 34 and supports the doors 40.

The frame 41 is formed by a front portion 42 and a rear portion 43 and two lateral portions 44, all rectilinear and joined to one another. The portions 42 and 43 are parallel to the axis A, while the portions 44 are parallel to the axis D, are arranged along the side elements 16 and have a length shorter than the length of the portions 42,43. The portion 42 is the one arranged at the front wall 15, close to the user during use, while the portion 43 is the one arranged in the position farthest from the user.

As mentioned above, in order to be raised and lowered, each door 40 rotates about a relative rotation axis E, which is parallel to the axis A. For example, to obtain this rotation, the doors 40 are directly coupled to the frame 41 through respective hinges. According to a preferred embodiment, the doors 40 are hinged to the portion 43. Advantageously, the radial width of each door 40 in respect to the rotation axis E is substantially equal to the distance between the portions 42 and 43. At the same time, the doors 40, in the lowered position, are arranged side-by-side so as to close, together, the entire area 23 along the axis A. In other words, the space between the portions 44 is divided into respective segments, which can be opened independently by the unit 13.

For each door 40, the device 22 comprises a relative lock 47 (illustrated schematically, and not described in detail), which is carried by the frame 41 and keeps the door 40 in the lowered closed position. As mentioned above, the locks 47 are controlled independently of one another.

Each lock 47 is preferably electrically operated and is controlled during opening by the unit 13 when the user is authorised to access a compartment below, provided in the corresponding segment of the area 23.

If necessary, as a function of the width of the compartments to be accessed, the unit 13 can open the locks 47 of two or more adjacent doors 40.

The locks 47 cannot be opened manually by the users, with the exception of a possible emergency mechanical opening system, to be used in case of malfunction or in a power outage.

After opening of the locks 47, the doors 40 are raised and lowered manually by the users. Advantageously, the doors 40 have respective gripping portions, having for example a slot 48, and arranged at the end opposite the aforesaid hinges, to allow the users to easily grasp the doors 40 and raise them manually.

Alternatively, raising and/or lowering of the doors 40 is obtained automatically through spring-loaded devices or actuators controlled by the unit 13.

Preferably, the locks 47 are automatically closed when the doors 40 are lowered.

As mentioned above, during operation of the device 22 according to the present invention, after having checked the authorisation of the user, and having identified the loading unit 4 and the compartment 10 to be accessed, the unit 13 controls the elevator 12 so as to arrange the loading unit 4 identified in the housing 17 and then controls the actuator 21 so as to tilt this loading unit 4.

Immediately after this, the unit 13 controls the winders 32,33 so that the end portions 30,31 of the cover 24 define the opening 26, in position aligned with the compartment 10 to be accessed by the user. Furthermore, the unit 13 releases the locks 47 associated with one or more doors 40, which are above this compartment 10 to obtain opening 27.

After having carried out the picking and depositing operations, the user manually lowers and closes the doors 40.

If the user encounters resistance in this closing rotation, this resistance can be caused by articles that extend beyond the height of the loading unit 4, so that the user must open the door 40 again and position the articles correctly. As soon as the user takes the doors 40 to the closed configuration, the locks 47 automatically block these doors 40. Subsequently, the unit 13 controls the winders 32,33 so as to close the opening 26. Alternatively, as mentioned above, closing of the doors 40 can be automatic.

From the above, it is evident how the device 22 represents an optimum compromise between flexibility of use and safety in respect to attempted tampering. In fact, the cover 25 by means of doors makes the device 22 sturdy, as it prevents direct access to the roller shutters 28,29, while the latter allow continuous adjustment of one of the two dimensions of the passage for the user through the area 23.

Furthermore, the solution with doors is particularly compact and simple, as it can be manually opened/closed and therefore does not require actuators and does not occupy spaces in the side elements 16. This makes it possible also to place several stations 12 side-by-side close to one another.

As the cover 25 is of the type with doors, and not with roller shutters, no additional electronic or physical barriers are required to guarantee the safety of the user. As well as simplifying the device 22, with consequent reduction in costs and increase in reliability, this also results in a reduction in the times of the picking/depositing operations.

As mentioned above, during manual closing of the doors 40, the user can directly check for articles that extend beyond the height of the loading unit 4 and that would prevent closing of the roller shutters 28,29, without it being necessary to provide dedicated presence detection sensors (such as photoelectric barriers).

It is also evident that the path portion 37 has a relatively limited width, so that opening and closing of the cover 24 takes place rapidly.

Furthermore, the solution with device 22 tilted or tiltable is particularly advantageous from the point of view of ergonomics for the user, both because it is easier to reach the compartments 10 that are close to the portion 43, and because the content of the compartments 10 is more easily visible. In fact, the user does not require to bend or to assume uncomfortable positions to see the articles or to carry out picking/depositing operations.

Other advantages in terms of simplicity of the solution proposed are evident or deducible for any person skilled in the art based on the constructional features indicated above.

Finally, from the above it is evident that modifications and variants can be made to the device 22 and to the station 11 described above with reference to the accompanying figures, without however departing from the scope of protection of the present invention as defined in the appended claims.

In particular, the roller shutters 28,29 could be slidable along the axis A, while the doors define a variable degree of opening along the axis D; and/or the doors 40 could be hinged to the portions 44; and/or each of the doors 40 illustrated in the accompanying figures could be replaced by a pair of doors openable independently of one another and hinged, for example, one to the portion 43 and the other to the portion 42; and/or the portions 44 could be absent.

The invention claimed is:

1. A picking/depositing station of an automated warehouse, the station comprising:
   a housing having dimensions so as to house at least one loading unit for picking articles from said loading unit and/or for depositing articles in said loading unit, and
   a selective access device, arranged above said housing to allow/prevent an access to said loading unit from above, said selective access device defining an access area and comprising:
   a) a first cover engaging said access area and defined by a pair of movable plane surfaces, which are parallel or coplanar to one another and are slidable along a first rectilinear axis (D) and are adapted to define a first opening in said access area;
   b) movement means controlled so as to move said movable plane surfaces along said first rectilinear axis (D); and
   c) a second cover engaging said access area, arranged above said first cover and configurable so as to open/close, in said access area, a second opening aligned with said first opening;
   said second cover being defined by a plurality of doors, each rotating about a relative rotation axis (E) in respect to said first cover to define said second opening;
   said doors being arranged side-by-side along a second rectilinear axis (A), orthogonal to said first rectilinear axis (D);
   said selective access device comprising, for each said door, a relative lock for keeping said door closed;
   wherein said movable plane surfaces can slide in opposite directions to open and close said first opening, and in that said rotation axes (E) are parallel to said second rectilinear axis (A);
   wherein one of said first and second rectilinear axes (D A) is horizontal, and the other of said first and second rectilinear axes (D,A) is tilted or tiltable in respect to a horizontal direction; and further comprising movement means for tilting said loading unit in said housing.

2. A selective access device for a picking/depositing station in an automated warehouse, the device defining an access area and comprising:
   a first cover engaging said access area and defined by a pair of movable plane surfaces, which are parallel or coplanar to one another and are slidable along a first rectilinear axis (D) and are adapted to define a first opening in said access area;
   movement means controlled so as to move said movable plane surfaces along said first rectilinear axis (D);
   a second cover engaging said access area, arranged above said first cover and configurable so as to open/close, in said access area, a second opening aligned with said first opening;
   said second cover being defined by a plurality of hinged doors, each rotating about a common rotation axis (E) in respect to said first cover to define said second opening; said common rotation axis (E) being horizontal to a ground surface; each door of said plurality of doors configured to pivot between an open position in which said door pivots away from the ground surface and a closed position in which said door pivots toward the ground surface;
   said doors being arranged side-by-side along a second rectilinear axis (A), orthogonal to said first rectilinear axis (D);
   the device comprising, for each said door, a relative lock for keeping said door closed;
   wherein said movable plane surfaces can slide in opposite directions to open and close said first opening, and in that said rotation axes (E) are parallel to said second rectilinear axis (A).

3. The device according to claim 2, further comprising a frame that defines the perimeter of said access area; said doors being hinged to said frame about the respective said rotation axes (E), and said locks being interposed between said doors and said frame.

4. The device according to claim 2, further comprising a front support portion, a rear support portion parallel to said front support portion and to said second rectilinear axis (A), and in that at least some of said rotation axes (E) extend along said rear portion.

5. The device according to claim 4, wherein said doors have a length that, when measured radially in respect to said rotation axes (E), is substantially equal to the distance between said front support portion and said rear support portion.

6. The device according to claim 2, wherein said doors must be manually lowered during the closing operations of the second cover.

7. The device according to claim 2, further comprising a control unit configured to control the release of said locks and to control said movement means.

8. The device according to claim 7, wherein said control unit is configured so as to close said first opening only after all the locks have been locked.

9. The device according to claim 2, wherein said first rectilinear axis (D) is orthogonal to said ground surface.

10. The device according to claim 2, further including a first winder for controlling movement of a first plane surface of the pair of movable plane surfaces and a second winder for controlling movement of a second plane surface of the pair of movable plane surfaces, said first winder being located above said second winder and is located above said rotation axis (E).

11. The device according to claim 2, wherein the pair of movable plane surfaces are vertically slidable along the first rectilinear axis (D).

\* \* \* \* \*